March 24, 1970 K. M. OGILVIE 3,502,110
HYDRAULIC ENCODER
Filed April 14, 1966 3 Sheets-Sheet 1
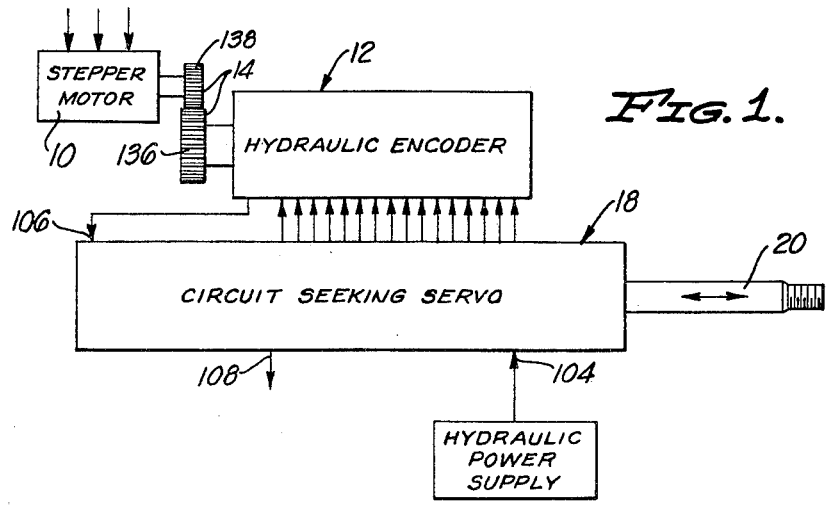
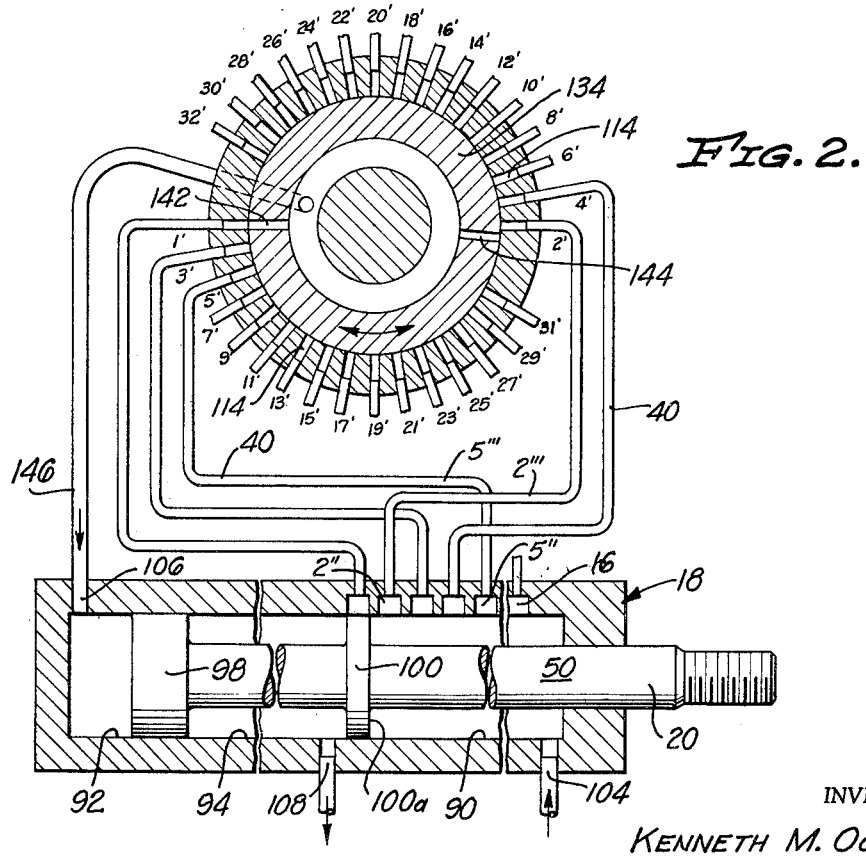
INVENTOR.
KENNETH M. OGILVIE
BY HIS ATTORNEYS
HARRIS, KIECH, RUSSELL & KERN

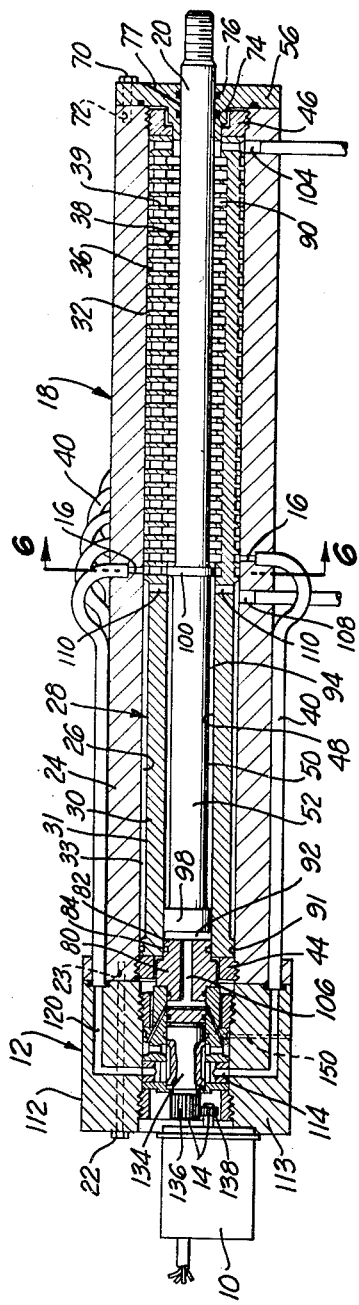

March 24, 1970     K. M. OGILVIE     3,502,110
HYDRAULIC ENCODER
Filed April 14, 1966     3 Sheets-Sheet 3
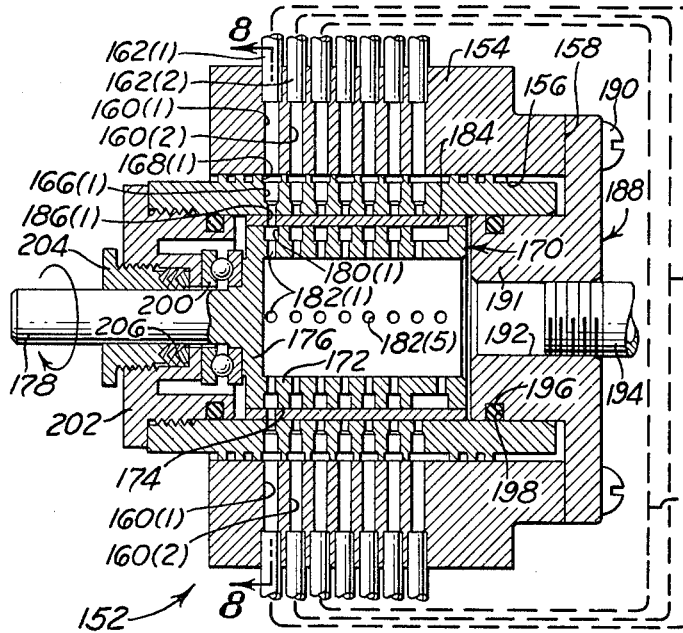
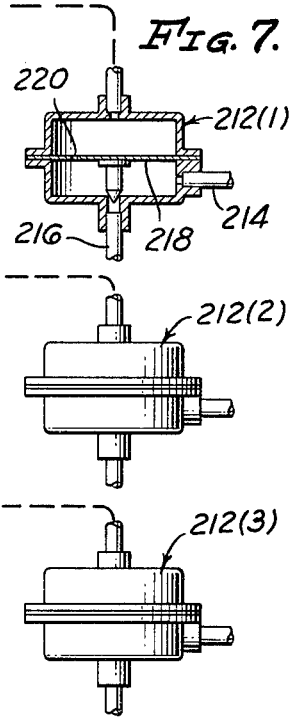
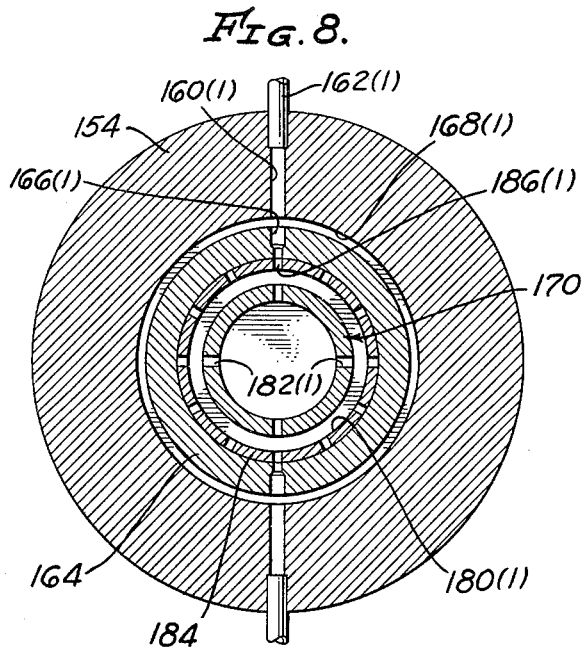
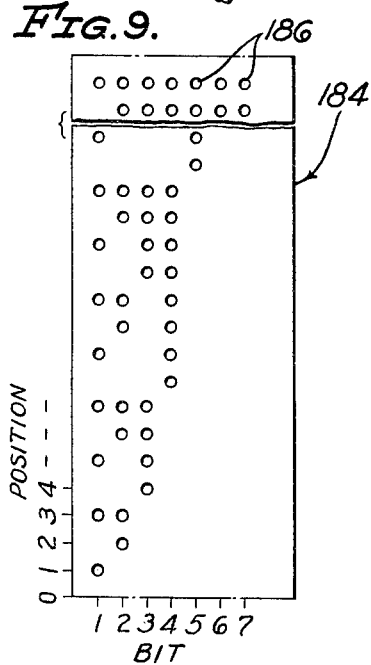
INVENTOR.
KENNETH M. OGILVIE
BY HIS ATTORNEYS.
HARRIS, KIECH, RUSSELL & KERN

United States Patent Office 3,502,110
Patented Mar. 24, 1970

3,502,110
HYDRAULIC ENCODER
Kenneth M. Ogilvie, Arcadia, Calif., assignor to Bertea Products, Pasadena, Calif., a corporation of California
Continuation-in-part of application Ser. No. 413,196, Nov. 23, 1964. This application Apr. 14, 1966, Ser. No. 542,640
Int. Cl. F16k *11/02*
U.S. Cl. 137—625.11
8 Claims

ABSTRACT OF THE DISCLOSURE

A hydraulic encoder having a rotatably mounted encoder cylinder with a plurality of apertures in spaced apart tracks in the outer wall thereof for selective registry with bit passageways in the fixed housing surrounding the encoder cylinder.

---

This invention relates generally to fluid control apparatus and more particularly to a novel hydraulic encoder which is especially suitable for use in a hydraulic system to provide digital mechanical positioning from electrical digital information.

This is a continuation-in-part application based upon application Ser. No. 413,196, filed Nov. 23, 1964 now Patent No. 3,246,572.

It is an object of the present invention to provide a rotary hydraulic switch or encoder especially designed for use with an incremental stepping device and which may be used in combination with the fluid actuated servo valve of the invention.

It is another object of the invention to provide an overall system to provide linear digital mechanical positioning from electrical digital information which may be used with various automated devices.

It is a still further object of the invention to provide a digital mechanical positioning system employing electrical digital information which is especially suitable for use in positioning a magnetic pickup in a computer memory system.

It is another object of the invention to provide a digital mechanical positioning system employing electrical digital information, which system is characterized by simple construction and a minimum of maintenance.

Further objects and advantages of the present invention will be apparent from the following specification and the accompanying drawings in which:

FIG. 1 is a schematic flow diagram of a hydraulic control system including a stepper motor, a hydraulic encoder embodying the teachings of the present invention, a circuit seeking servo, and a hydraulic power supply;

FIG. 2 is a schematic representation of the hydraulic encoder and circuit seeking servo of the system of FIG. 1;

FIG. 3 is a longitudinal sectional view through an integral unit comprising a stepper motor at the far left of the figure, a hydraulic encoder immediately adjacent thereto, and a circuit seeking servo in the center and to the right side of the figure;

FIG. 4 is a fragmentary, enlarged, longitudinal sectional view of the hydraulic encoder portion of the unit of FIG. 3;

FIG. 5 is an enlarged, fragmentary, transverse sectional view taken along the line 5—5 of FIG. 4;

FIG. 6 is an enlarged transverse sectional view taken along the line 6—6 of FIG. 3, illustrating a central portion of the circuit seeking servo of the unit of FIG. 3;

FIG. 7 is a longitudinal sectional view of a modified encoder, shown connected schematically in an operative system containing diaphragm valves of conventional construction;

FIG. 8 is a transverse sectional view of the modified encoder, taken on the line 8—8 of FIG. 7; and FIG. 9 is a plan view of a binary encoder sleeve such as contained in the encoder of FIG. 7, shown as it would appear if it were "unwrapped" and made planar.

GENERAL DESCRIPTION OF HYDRAULIC CONTROL SYSTEM

Referring to FIG. 1, there is schematically illustrated an electrical stepper motor 10 having three windings and, in the particular embodiment illustrated, a discrete stepping time of .0015 second. The particular system illustrated is especially suitable for use in positioning the magnetic pickup in a computer memory system. The motor is capable of 660 p.p.s. (pulses per second) synchronous operation but is used at 250 p.p.s. to give an ample force margin. A train of signals is fed to a controller (not a part of the invention and of conventional design) which, in turn, drives the three-phase stepping motor 10. The stepper motor 10, which moves in 15 degree steps, is geared down to a 2:1 ratio and drives a hydraulic encoder or selector valve 12 through a gear train 14 in 7½ degree steps. The hydraulic encoder 12 selects, in sequence, actuator ports 16 of the servo valve (circuit seeking servo) and the servo valve moves to the selected port, thus providing digital mechanical positioning of an actuator rod 20 and the mechanism connected thereto.

CIRCUIT SEEKING SERVO

The circuit seeking servo or fluid actuated servo valve 18 of the integral unit (FIG. 3) is removably fastened to the hydraulic encoder 12 (a rotary selector valve in the embodiment illustrated) by bolts 22 whose inner ends are received in tapped holes 23 located in the left end of a tubular valve body 24 of the servo valve. A bore 26 of the tubular valve body 24 houses an elongated integral sleeve 28, which as viewed in the left of FIG. 3, has a first portion 30, which for a greater portion of its length has its outer wall 31 spaced from the bore 26 defining an elongated annular space 33. The other end (right end in FIG. 3) or second portion 32 of the sleeve 28 is provided with a series or row of aligned outer and inner circular grooves 36 and 38 located, respectively, on the outer face of the sleeve and its bore. The aligned pairs of outer and inner grooves 36 and 38 of the sleeve 28 are connected by four equally spaced, circumferentially located passages 39 (see FIGS. 3 and 6).

The valve body 24 is provided, as mentioned before, with a row of closely spaced actuator ports 16, spirally located in the valve body. Each of the several actuator ports 16 opens into a respective one of the previously described outer grooves 36 of the sleeve 28. The outer ends of the respective several actuator ports 16 of the valve body 24 are counterbored to provide enlarged holes to receive and securely hold a series of fluid lines 40, which lines 40 connect to the encoder 12. The sleeve 28 is positioned within the valve body by retainer rings 44 and 46, respectively, which engage internal threads located at the opposite ends of the valve body 24.

The valve body 24 and, more precisely speaking, a bore 43 of the sleeve 28 slidably support a movable control member 50 which includes an actuating rod 52 that projects through an end of the valve body and is journaled in a bore of an end enclosure plate 56 which is held to the right-hand end (FIG. 3) of the valve body by several bolts 70 engaging internally threaded holes 72.

A pair of O-rings 74 and 76 is seated in recesses of the bore of the end enclosure plate 56 and engages the actuating rod 52. In the particular embodiment illustrated, there is provided an oil seepage passage 77 between the two O-rings 74 and 76.

The opposite end of the circuit seeking servo 18 adjoining the hydraulic encoder 12 is closed by a generally T-shaped end member 80 which has a cylindrical protrusion 82 which extends into the bore 48 of the sleeve 28, there being provided an O-ring seal 84 between the protrusion and the bore to minimize fluid loss. It will also be seen that the left-hand end (FIG. 3) of the sleeve 28 is flared outwardly to provide a sealing surface for engagement with the bore 26 of the valve body 24, there again being provided an O-ring seal 91 between the two members.

Reference to FIGS. 2 and 3 will show that the movable control member 50 divides the interior of the valve body 24, more precisely speaking the interior of the sleeve 28, into a pressure section or chamber 90 of variable length at one end thereof and into an actuating section or chamber 92 again of variable length at the other end of the valve body, with an exhaust section or chamber 94 of constant length therebetween. The movable control member 50, or more exactly speaking the actuating rod 20, supports a first piston 98 at the end of the rod within the valve body at the left of FIG. 3. This first piston 98 and the protrusion 82 of the end member 80 define the variable size actuating chamber 92. In FIG. 3 the device is shown in its fully retracted position. A second piston 100 is spaced away from the first piston 98 and is located more or less centrally of the length of the actuating rod 20. The first and second pistons 98 and 100, respectively, therebetween define the exhaust chamber 94. With movement of the actuating rod 52, the second piston 100 serves as an actuator control land for the opening and closing of the several actuator ports 16, exposing the various ports 16 to either the pressure section 90 or the exhaust section 94 of the servo valve.

A pressure supply port 104 connected to a hydraulic power supply opens into the pressure section 90 between the row of closely spaced actuator ports 16 and the enclosure plate 56 at the right end (FIG. 3) of the servo valve. A fluid supply port 106 located in the valve body 24 and, more precisely, the end member 80 (at the left end of the servo valve as seen in FIG. 3) opens into the actuating section 92. An exhaust port 108, also located in the valve body 24, opens laterally therethrough into the exhaust section or chamber 94. Reference to FIG. 3 will show that the exhaust port 108, more exactly speaking, connects with the elongated annular space 33 between the sleeve 28 and the bore 26 of the valve body 24 and the annular space 33, in turn, is connected through a plurality of passages 110 into the interior of the sleeve 28.

HYDRAULIC ENCODER

The hydraulic encoder 12, which, in the embodiment illustrated in FIGS. 2–6 takes the form of a rotary selector valve, may be viewed as a means for selectively connecting one of the closely spaced actuator ports 16 of the servo valve member 18 to the fluid supply port 106 and through that port to the interior of the actuating section or chamber 92. As mentioned above, the hydraulic encoder 12 is driven by an incremental stepping device, e.g., the stepper motor 10.

The hydraulic encoder or rotary valve 12 includes a stator member 112 (FIG. 3) which is provided with a plurality of circumferentially arranged valve ports 114, 120 which are connected to a like plurality of the previously mentioned fluid lines 40 to the actuator ports 16 of the circuit seeking servo 18.

The stator member 112 comprises several components, including a tubular housing 113 having a relatively thick wall through which circumferentially spaced passages 120 connect the several external fluid lines 40 from the servo valve 18 to the aforementioned circumferentially arranged valve ports 114. In addition, the stator member 112 of the hydraulic encoder includes a relatively thin annular disc or plate-like member 124 (see enlarged fragmentary views of FIGS. 4 and 5) which contains the aforementioned radially extending, circumferentially arranged ports 114. For ease of manufacture and because of the limitations imposed by the small dimensions involved, each of the ports 114 comprises a hole 114a extending radially of the disc 124 and a transversely extending hole 114b, which latter hole opens into a milled slot 114c formed in the inner face of the disc, all of which will be best understood with reference to FIGS. 4 and 5. The foregoing disc or plate-like member 124 and its novel construction is a special feature of the rotary valve or encoder of the subject invention.

The annular disc member 124 of the stator member 112 is positioned between a lock ring 126 and a tubular spool member 128, which last-mentioned two members are held in position by retaining rings 130 and 132, respectively, which threadedly engage the inner surface of the thick-walled tubular housing 113 of the stator member.

The hydraulic encoder 12 has a cylindrical rotor 134 (FIG. 4) which is rotatably supported within the annular disc member 124 and the tubular spool member 128. The cylindrical rotor 134 has at its outer end an integrally formed driven gear 136 which meshes with a smaller, driver gear 138 of the motor 10. The two gears 136 and 138 comprise the aforementioned gear train 14. The rotor 134 has at its inner end an integrally formed protrusion 140 of reduced diameter which slidably abuts a sealing member adjacent one end of the servo valve end member 80.

As best seen in FIG. 4, the cylindrical rotor 134 is retained within the hydraulic encoder 12 by an inwardly extending circular flange portion 126a which is an integral part of the lock ring 126. The lock ring flange portion 126a slidably engages a radially extending shoulder of the rotor 134.

In the particular embodiment illustrated in FIGS. 4 and 5, the rotor 134 is provided with nearly diametrically, opposed longitudinally extending fluid slots or kerfs 142 and 144 in its outer cylindrical surface. The fluid slots 142 and 144 (FIG. 4) at the left-hand ends thereof are, with the rotation of the rotor 134, brought separately into sequential alignment or communication with the inner ends of the circumferentially arranged ports 114 of the annular disc member 124 of the larger stator member 112. The opposite or right-hand ends of the two fluid slots or kerfs 142 and 144 are always in communication with circuitous passageways 146 contained in the spool 128 (see FIG. 4), which passageways eventually open into the fluid supply port 106 of the actuating chamber 92. A close examination of FIG. 4 will show that the circuitous passageways 146 include an annular groove 146a in the inner peripheral surface of the spool member 128, with the annular groove 146a immediately adjoining the rotor and communicating with the fluid slots 142 and 144 of the rotor 134. The annular groove 146a is in communication with radially extending fluid passages 146b which, in turn, are in communication with an outer annular groove 146c located on the outer peripheral surface of the spool member 128. From the latter groove 146c, sloping passages 146d communicate with an annular groove 80a of the servo valve end member 80.

The groove 80a is connected by radially extending passages 80b with the outer end of the fluid supply port 106. The hydraulic encoder 12 is provided with an oil seepage passage 150 which at its inner end adjoins the rotor 134 and extends radially outward therefrom through the spool member 128 and stator housing 113.

OPERATION

The operation of the fluid control system and its individual components is best understood with reference to the schematic representations of FIGS. 1 and 2. The circuit seeking servo 18 is of a type classified as an unbalanced area actuator in which full system pressure is supplied from a hydraulic power supply via tool 104 to the pressure chamber 90. Thus it is seen that full system pressure is applied to the annular retrack surface 100a of the control land or second piston 100. The control pressure for the head of the first piston 98 of the actuating chamber 92 is delivered from the respective ones of the actuator ports 16 if the servo valve 18. In the schematic showing of FIG. 2, the several circumferentially arranged valve ports 114 of the encoder 12 have been given individual numbers such as 1′, 2′, 3′, 5′, etc. It will be seen that each of these encoder valve ports 114 is connected by a separate fluid line 40 to a single one of the several closely spaced actuator ports 16 of the circuit seeking servo valve 18. As explained above in the section describing the encoder, the elongated fluid slots 142 and 144 of the rotor 134 are connected through the passage 146 to the actuating chamber 92 of the circuit seeking servo 18.

In operation, a signal is applied to the three-phase stepping motor 10 which moves in 15° steps and is geared down to a 2:1 ratio to drive the hydraulic encoder 12 either clockwise or counterclockwise, placing one of the fluid slots 142 or 144 of the rotor 134 in alignment with one of the several circumferentially arranged radial ports 114, say, port 5′, which means that the fluid slot 142 moves into alignment with the radial port 5′ and thus opens the pressure chamber 90 through an actuator port 16 (designated 5″ in FIG. 2) and fluid lines 40 (designated 5‴) to the rotary valve port 5′, resulting in control pressure being supplied through the fluid supply port 106 to the actuating chamber 92. The pressure supplied to the actuating chamber 92 moves the control member 50 to the right of FIG. 1 until the actuator control land or piston 100 reaches the selected port, namely, in this instance, the actuator port 5″. The actuator control land 100 then closes off the pressure and once again no pressurized fluid is being delivered to the rotary valve and through it to the actuating chamber 92 of the circuit seeking servo. It will be noted in the drawings that the edges of the control land align with the edges of the actuator port. By making the actuator ports 16 and the control land 100 the same length and providing sharp edges, a very steep rate of change of pressure is assured which will position the actuator rod 20 within .0002 to .0005 of an inch. The area of the actuator ports 16 determines the peak velocity and their length controls the deceleration at the end of the stroke. In some applications, it is desirable that the control land 100 cover two actuator ports 16 in order to give a deceleration distance twice that provided with a single actuator port. In such latter application, it is desirable that the two slots 142 and 144 of the rotary valve be 180° diametrically opposed for optimum hydraulic balance. It will be noted that in the particular embodiment illustrated in the drawings, the slots 142 and 144 are very close to being 180° apart which, of course, is desirable from a hydraulic balance standpoint.

In the schematic representation of FIG. 2, the control member 50 is shown in its fully retracted position and in the preceding paragraph there has been described a partial extension of the control land to bring it into alignment with the actuator port 5″. It will now be assumed that the stepper motor 10 has been provided with a signal which causes the rotor 134 of the encoder 12 to move its fluid slot 144 into alignment with the radial valve port 2′. It will be remembered that at this point in time or immediately preceding, the control land 100 is covering the actuator port 5″ which is to the right of actuator port 2″ which is the actuator port most recently selected by the hydraulic encoder. This being so, the actuator port 2″ of the circuit seeking servo opens into the exhaust chamber 94 lying between the control land 100 and the piston 98 of the control member 50. It will thus be seen that with movement of the fluid slot 144 into alignment with the radial valve port 2′ of the hydraulic encoder 12 there is an open passage for movement of fluid from the actuating chamber 92 via line 146 through the encoder, line 40 (more exactly speaking, line 2‴) and through the open actuator port 2″ into the exhaust chamber 94. The exhaust chamber 94 of the circuit seeking servo is connected via exhaust port 108 to a hydraulic fluid reservoir. The full system pressure applied to the annular face 100a of the control land 100 will, with aligning of fluid slot 144 of the rotor with the rotor valve port 2′, cause the control member 50 and its actuator rod 20 to move to the left of FIG. 2 towards actuator port 2″. When the actuator control land 100 reaches the selected port, here actuator port 2″, it closes off the exhaust chamber 94 of the circuit seeking servo to the rotary valve or encoder 12 and the servo 18 has once again reached equilibrium and will remain so until the hydraulic encoder 12 in response to movement by the stepper motor 10 moves one of the fluid passages 142 and 144 of the rotor into alignment with another one of the radial ports 114 of the encoder.

A modified rotary, hydraulic encoder 152 is shown in FIG. 7, which encoder is also adapted to be driven in a stepwise fashion by a stepper motor such as the motor 10 shown in FIGS. 1 and 3 and described above.

The encoder 152 includes a body or housing 154 with a central cylindrical bore having a peripheral surface 156 and an end face 158. Two longitudinal rows of radially extending bit passageways 160 are provided in the body 154 in diametrically opposed or 180° apart relationship, each passageway extending from the peripheral surface 156 to the outer surface of the body where each receives one end of a conduit 162. For ease of description, the various passageways will be further identified as 160(1), 160(2), etc., and the various conduits as 162(1), 162(2), etc.

Securely fastened within the body 154, as by shrink fitting, is a bit sleeve 164 which contains two similarly positioned longitudinal rows of ports or bits 166, spaced 180° apart, which ports or bits are in radial alignment with the previously described passageways 160. Each set of opposed bits 166 is in fluid communication at the outer ends thereof by means of an annular groove 168 which is formed in the outer peripheral face of the bit sleeve 164.

Rotatably mounted within the body 154 and its bit sleeve 164 in a manner which will be described more fully hereinafter, is an encoder cylinder or hollow drum 170 which has an outer wall portion 172 with an outer peripheral surface 174 and an end wall portion 176 to which is connected a shaft 178 for rotating the encoder cylinder 170 relative to the bit sleeve 164. The other end of the cylinder is open.

The outer peripheral surface 174 of the wall portion contains a plurality of axially spaced, annular grooves 180 which are in radial alignment with the ports or bits 166 in the bit sleeve, and each of these grooves is in communication with the interior chamber of the encoder cylinder through a plurality of passageways 182 spaced circumferentially around the encoder cylinder.

Fastened to the outer peripheral surface 174 of the outer wall portion of the encoder cylinder 170 (as by shrink fitting thereon) is an encoding sleeve 184 (shown in an "unwrapped" position in FIG. 9) which is provided with a plurality of ports or apertures 186 arranged in spaced-apart tracks which encircle the encoder cylinder and which are in radial alignment with the bits 166. It is to be understood that the outer peripheral surface of the encoding sleeve 184 is lap-fitted with the inner peripheral surface of the bit sleeve 164 to reduce friction and to provide for a proper seal between these surfaces which have relative rotational movement therebetween.

It will be readily apparent that with the encoding sleeve 184 in the position shown in FIGS. 7 and 8, fluid in the diametrically opposed conduits 162(1) can flow through the passageways 160(1), into the annular groove 168(1), through the passageways or bits 166(1), through the ports or apertures 186(1) in the encoding sleeve, into the annular groove 180(1), and thence through the passageways 182(1) into the interior chamber of the encoder cylinder 170.

The flow of the fluid to the encoder cylinder 170 from diametrically opposed channels or ports, 180° apart, provides a pressure balance which decreases frictional losses and fluid-seal problems.

Turning to the mechanical or physical means for supporting the encoder cylinder 170 within the body or housing 154, an end member 188 (FIG. 7) is fastened to the end face 158 of the body 154 as by means of machine screws 190, said end member 188 having a hub portion 191 which extends into the interior of the bit sleeve 164 and which is provided with an axial passageway 192 in communication with the interior chamber of the encoder cylinder 170. The passageway 192 has a conduit 194 connected thereto for conveying fluid away from the interior chamber of the encoder cylinder, for a purpose to appear.

Suitable fluid sealing means are provided between the hub portion 191 and the fixed bit sleeve 164, as, for example, a conventional O-ring 196 positioned in an annular groove 198.

Adjacent the shaft end of the encoder cylinder 170 is a thrust bearing 200, a follower 202 which is in threaded engagement with the inner peripheral surface of the bit sleeve 164 and which engages said thrust bearing, and a packing nut 204 which is in threaded engagement with the follower and which in turn engages wedge type packing 206 positioned about the shaft 178. The follower is also provided with a conventional O-ring in an annular groove. Thus, the O-ring in the groove and the packing 206 provide a conventional fluid seal between the shaft 178 and the bit sleeve 164.

Although the hydraulic encoder 152 which has been described can be used with various items of equipment, including the circuit seeking servo 18 of FIG. 1, there is shown schematically in FIG. 7, a very simple operative circuit which utilizes diaphragm type valves 212(1), 212(2), etc. of conventional construction. Each of the aforementioned diaphragm valves includes an inlet 214, an outlet 216, a diaphragm 218 with an equalizer port 220 therethrough, and a bleed or relief port 222 which is in communication with the conduit 162(1), 162(2), etc.

Thus, assuming that the diaphragm valves are in the closed position (FIG. 7) with fluid below and above the diaphragms 218, when the encoder cylinder 170 is rotated to the position shown in FIGS 7 and 8, bit number 1 (FIG. 9) is in position number 1 whereby the diametrically opposed ports or bits 166(1) in the bit sleeve 164 are in alignment with the ports or apertures 186(1) to permit the flow of fluid from the conduits 162(1) to the interior of the encoder cylinder, and thence through the conduit 194 as previously described.

This transfer of fluid will release the fluid pressure from the chamber above the diaphragm 218 in the valve 212(1), thereby causing the valve to open and provide for fluid flow between the inlet 214 and the outlet 216.

In like manner, if the encoder cylinder were moved to position number 3, valves 212(1) and 212(2) would be opened.

Although in this modified form of encoder, the encoder cylinder or drum 170 has been shown and described as being in the form of a cylinder, it is to be understood that somewhat the same result can be achieved by substituting for the cylinder 170, a rotatably mounted, flat cylindrical plate with the ports arranged in concentric circular tracks, and with the bits 166 extending in an axial direction or at right angles to such a circular plate.

What is claimed is:

1. A hydraulic encoder, comprising:
a fixed, annular disc-like member with opposed faces and an outer peripheral surface, containing a central bore and a plurality of radially extending, circumferentially arranged, spaced-apart passageways therein, each of said passageways including a radially positioned opening extending from the outer peripheral surface to a transversely extending opening which opens into a transversely extending slot formed in the central bore;
means positioned adjacent each of the opposed faces of the disc-like member closing the ends of the transversely extending openings and transversely extending slots;
a stator member which receives and supports the annular disc-like member;
an outlet passageway in the stator member; and
a rotor member rotatably mounted in said central bore in sliding engagement with the inner surface thereof and containing at least one fluid passageway for connecting various of the passageways in the disc-like member with the outlet passageway in the stator member, said rotor member being rotatable in both the clockwise and the counterclockwise directions.

2. A hydraulic encoder, comprising:
a body member with a face surface;
a plurality of spaced-apart bit passageways in said body member having one end thereof terminating at said face surface;
a rotary encoder member containing a main passageway therein mounted for rotation relative to said body member and having a wall face in sliding fluid-sealing engagement with the face surface of the body member;
a plurality of passageways in spaced-apart tracks in said encoder member for selectively placing various of the bit passageways in the body member in communication with said main passageway in the encoder member.

3. A hydraulic encoder, comprising:
a body member containing a cylindrical bore providing an inner surface;
a plurality of spaced-apart bit passageways in said body member having one end thereof terminating at the inner surface of the bore;
an encoder cylinder with an internal chamber and an outer wall portion having an outer peripheral surface, rotatably mounted in the cylindrical bore with said outer peripheral surface in sliding fluid-sealing engagement with the inner surface of the bore;
an outlet passageway in the body member in communication with the internal chamber of the encoder cylinder; and
a plurality of apertures in spaced-apart tracks in the outer wall portion of the encoder cylinder for selectively placing various of the bit passageways in the body member in communication with said internal chamber.

4. A hydraulic encoder as set forth in claim 3 in which the spaced-apart bit passageways in the body member are arranged in two longitudinally extending rows spaced approximately 180° apart.

5. A hydraulic encoder as set forth in claim 3 in which the apertures in the encoder cylinder are contained in a separate encoding sleeve which is fixedly mounted on the outside of said cylinder, and are arranged in spaced-apart tracks encircling said sleeve.

6. A hydraulic encoder as set forth in claim 3 in which:
the encoder cylinder has an open end which is in communication with the outlet passageway in the body member;
the apertures in the encoder cylinder are contained in a separate encoding sleeve which is mounted on the outside of the encoder cylinder; and
the outer wall portion of the encoder cylinder contains a plurality of annular grooves which are in communication with said apertures in the tracks and with the internal chamber.

7. A hydraulic encoder as set forth in claim 3 in which:
the inner surface of the cylindrical bore at which the ends of the spaced-apart bit passageways terminate is provided by the inner cylindrical surface of a separate bit sleeve which is mounted within the bore of the body member;
the encoder cylinder has a closed end to which is connected a driving shaft and an open end in communication with the outlet passage in the body member;
the apertures in the encoder cylinder are contained in a separate encoding sleeve which is fixedly mounted on the outside of the encoder cylinder; and
the outer wall portion of the encoder cylinder contains a plurality of axially spaced, annular grooves in registry with said aperture tracks and which are in fluid communication with said apertures in the tracks and with the internal chamber.

8. A hydraulic encoder, comprising:
a body member including a separate bit sleeve having an inner face surface;
a plurality of spaced-apart bit passageways in said bit sleeve having one end thereof terminating at said inner face surface;
a rotary encoder member mounted for rotation relative to said body member and including an outer wall face in sliding fluid-sealing engagement with the inner face surface of the bit sleeve;
a main fluid passageway in the body member; and
a plurality of spaced-apart passageways in said encoder member for selectively placing various of the bit passageways in communication with said main fluid passageway.

References Cited

UNITED STATES PATENTS

| | | | |
|---|---|---|---|
| 2,917,027 | 12/1959 | Hayse | 137—625.24 |
| 3,021,869 | 2/1962 | Ross | 137—625.24 |
| 3,034,528 | 5/1962 | Wharff | 137—625.11 XR |
| 3,073,289 | 1/1963 | Candelsie | 137—625.11 XR |

HENRY T. KLINKSIEK, Primary Examiner

U.S. Cl. X.R.
137—625.24